Figure 1:
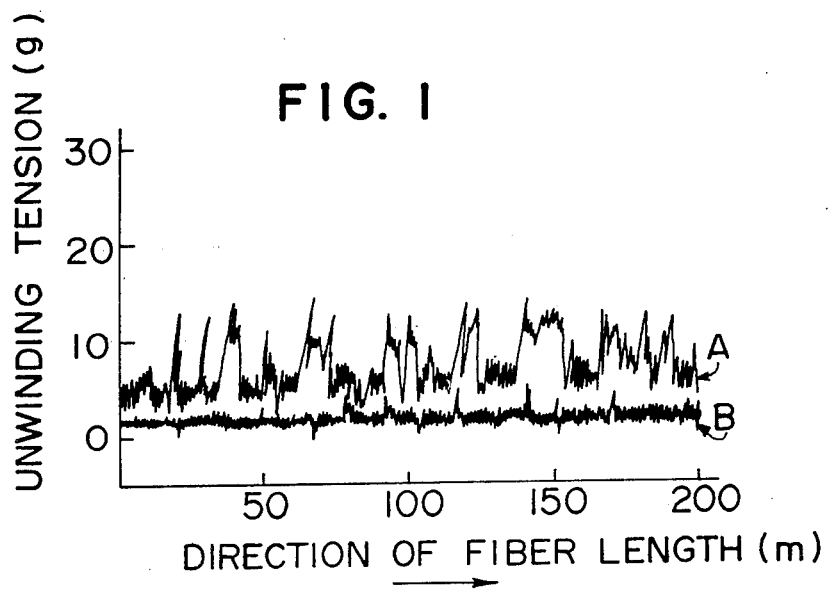

United States Patent [19]
Ishicawa et al.

[11] 3,915,912
[45] Oct. 28, 1975

[54] MODIFIED POLYAMIDE COMPOSITIONS CONTAINING A POLYETHYLENE GLYCOL DERIVATIVE AND A FATTY ACID OR FATTY ACID SALT

[75] Inventors: Tatsuo Ishicawa; Teruomi Wakabayashi; Mutsuo Matsuki; Tetsuhiro Kusunose, all of Nobeoka, Japan

[73] Assignee: Asahi Kasei Kogyo Kabushiki Kaisha, Osaka, Japan

[22] Filed: May 1, 1973

[21] Appl. No.: 356,068

Related U.S. Application Data

[63] Continuation of Ser. No. 120,453, March 3, 1971, abandoned.

[30] Foreign Application Priority Data
Mar. 5, 1970   Japan.............................. 45-18307

[52] U.S. Cl....... 260/18 N; 260/32.6 N; 260/33.4 R; 260/33.6 R; 260/78 S; 260/857 PG
[51] Int. Cl............................................. C08g 41/04
[58] Field of Search........... 260/18 N, 78 S, 857 PG

[56] References Cited
UNITED STATES PATENTS

| | | | |
|---|---|---|---|
| 3,156,750 | 11/1964 | Cuculo.................................. | 260/18 |
| 3,329,633 | 7/1967 | Crovatt................................. | 260/18 |
| 3,342,762 | 9/1967 | Crovatt................................. | 260/18 |
| 3,470,139 | 9/1969 | Marshall et al..................... | 260/33.6 |
| 3,516,956 | 6/1970 | Reedy et al.......................... | 260/18 |
| 3,554,980 | 1/1971 | Ando et al............................ | 260/18 |
| 3,632,666 | 1/1972 | Okazaki et al....................... | 260/78 |
| 3,669,917 | 6/1972 | Ando et al............................ | 260/78 |

FOREIGN PATENTS OR APPLICATIONS

| | | | |
|---|---|---|---|
| 6,618,087 | 12/1966 | Netherlands........................ | 260/18 |
| 748,485 | 12/1966 | Canada................................ | 260/857 |
| 1,516,291 | 3/1968 | France................................. | 260/857 |
| 1,370,223 | 7/1964 | France................................. | 260/18 |
| 234,328 | 11/1959 | Australia............................... | 260/18 |
| 1,156,226 | 10/1963 | Germany............................. | 260/18 |

*Primary Examiner*—Eugene C. Rzucidlo
*Attorney, Agent, or Firm*—Armstrong, Nikaido & Wegner

[57] ABSTRACT

Modified polyamide fibers containing a polyethylene glycol or its derivative can be produced without accompaniment of inter-filamentary or inter-yarn adhesion which has been a drawback at the time of spinning of said type of polyamide fibers, by using as a raw material of melt spinning a polyamide which is obtained by incorporating in said polyamide one or more of long chain fatty acids having carbon atoms of 11 or more or salts formed between said fatty acids and metals of Ist, IInd or IIIrd group of the Periodical Table, long chain alcohols having carbon atoms of 11 or more, esters of said long chain alcohols, higher alkyl amines having carbon atoms of 11 or more, or higher alkanoyl amides having carbon atoms of 11 or more.

3 Claims, 2 Drawing Figures

MODIFIED POLYAMIDE COMPOSITIONS CONTAINING A POLYETHYLENE GLYCOL DERIVATIVE AND A FATTY ACID OR FATTY ACID SALT

This is a continuation, of application Ser. No. 120,453, filed Mar. 3, 1971 now abandoned.

This invention relates to a method for producing modified polyamide fibers. More particularly, it relates to a method for producing modified polyamide fibers containing a polyethylene glycol type compound without accompaniment of inter-filamentary adhesion at the time of melt spinning and with excellent drawability of yarns.

In general, the polyamide containing polyethylene glycol and/or its derivative can be made into filaments by a melt-spinning method and resultant fibers have such a characteristic feature that the generation of static electricity which is the biggest drawback of conventional synthetic fibers, is slight.

However, when the common spinning conditions for polyamides are employed at the time of spinning of such polyamides containing polyethylene glycol and/or its derivative, various troubles such as adhesions between monofilaments or between filament yarns, reduction of drawability due to poor slipperiness and the like, take place during the production time.

It is believed that such a phenomenon occurs by the change of the surface structure of fibers such as increase of hydrophilic property, slippiness and the like due to included polyethylene glycol.

On this account, there have been proposed various attempts such as use of a straight oil, steaming to spinning columns at the time of spinning and the like. The former, however, brings about such troubles that the change of undrawn filament yarns with elapse of standing time after being taken-up is great due to moisture absorption and drawing process becomes difficult due to a large amount of adhered oil or fat. The latter has also such a drawback that a special apparatus is necessary for steaming.

Accordingly, it is an object of the present invention to provide a process for producing modified polyamide fibers containing a polyethylene glycol type compound wherein the adhesion of filaments or yarns at the time of spinning and the reduction of drawability which is accompanied by the adhesion are prevented.

The above-mentioned object can be attained by the method of the present invention.

According to the method of the present invention, 0.01 to 2 % by weight of a specified additive is incorporated into a polyamide containing 0.5 % by weight or more of a polyethylene glycol and/or its derivative and the resultant composition is subjected to conventional melt-spinning condition for polyamide to produce modified polyamide fibers.

The polyamides herein referred to include the polyamides which are produced by polymerizing lactams, ω-aminocarboxylic acids and salts of diamines and dicarboxylic acids. For example, polycaprolactam, polyhexamethylene adipamide, polyhexamethylene dodecamide, polyhexamethylene sebacamide, mixtures of polycaprolactam with one kind of polyhexamethylene adipamide, polyhexamethylene terephthalamide, polyhexamethylene dodecamide, polyhexamethylene sebacamide, polylaurolactam and the like, and mixtures of polyhexamethylene adipamide with one kind of polyhexamethylene terephthalamide, polyhexamethylene dodecamide, polyhexamethylene sebacamide, polylaurolactam and the like are illustrated.

As for polyethylene glycols and their derivatives, those which are used as non-ionic type antistatic agent for polymers are illustrated. For example, they include polyethylene glycol homopolymers, the polymers in which polyamides and polyethylene glycols are chemically combined, for example, through ester linkage, amide linkage, urethane linkage or the like, and polymers obtained by adding the foregoing polymers to compounds having active hydrogen atoms, such as organic acids, alcohols, amines, amides or the like.

As for incorporating methods of polyethylene glycol or their derivatives, they can be added at polymerization time or at spinning time. The amount of addition of these compounds lies in the range of 0.5 – 10 % by weight, considering from the antistatic effect and molding property.

The specified additive useful in the method of the present invention include:

long chain fatty acids having carbon atoms of 11 or more and having boiling points of 200°C or more, such as lauric acid, myristic acid, palmitic acid, stearic acid, arachic acid, behenic acid, palmitolic acid, oleic acid, linoleic acid linolenic acid, or the like;

salts formed between the foregoing long chain fatty acids and metals of groups I, II and III of the Periodical Table; long chain fatty alcohols having carbon atoms of 11 or more and having boiling points higher than 200°C, such as lauryl alcohol, cetyl alcohol, stearyl alcohol, oleyl alcohol, or the like; esters of long chain fatty acids having carbon atoms of 11 or more, such as methyl oleate, octyl oleate, oleyl oleate, tridecyl oleate, ethyl palmitate, propyl palmitate, n-butyl palmitate, n-butyl stearate, octyl stearate, oleyl laurate, lauryl laurate, lauryl benzoate or the like;

higher alkylamines such as lauryl amine, stearyl amine, oleyl amine, cetyl amine or the like;

higher alkanoyl amides which are condensates of long chain fatty acids and ammonia, monoamide or/and diamine, such as stearamide, lauramide, palmitamide, stearoyl ethylamide, stearoyl hexamethylene diamide;

hydrocarbons having boiling points higher than 200°C such as dodecane, tridecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane, triacontane, dotriacontane, pentatriacontane, tetracontane, pentacontane, hexacontane, dohexacontane, tetrahexacontane, or the like.

These compounds can be used solely or in the form of a mixture of two or more. The long chain fatty acids, long chain fatty alcohols and hydrocarbons having boiling points lower than 200°C are not suitable to be used in the present method from the effect of heat stability and slippiness.

The mechanism of action of the foregoing compounds for the prevention of inter-filamentary adhesion and reduction of drawability at spinning in the method of the present invention is not clearly known yet. However, considering from the fact that these troubles are alleviated by increasing the concentration of aqueous emulsion type spinning oil or broadening the width of oiling rollers, etc., it is believed that the addition of a polyethylene glycol and/or its derivative varies surface characteristics of filaments thereby to cause the deficiency of affinity to an oiling agent, the unevenness of the adhesion of the oiling agent and leads to the above-mentioned troubles.

Thus it is assumed that the effectiveness of the present invention can be achieved by controlling the variation of surface characteristics of filaments caused by the action of a polyethylene glycol and/or its derivative upon an oiling agent by the aid of a higher hydrocarbon compound or the like.

The amount of addition of these compounds is preferably in the range of 0.01 to 2 % by weight based upon a polyamide. Sufficient effectiveness cannot be achieved by an amount less than 0.01 % by weight. It is possible to add more than 2 % by weight, but lubricating effect becomes excessive and such phenomena as collapse of package form at the time of take-up of spinning and thread-cut at the time of spinning and drawing due to additive itself become notable.

Further with regard to the addition, it is necessary that an additive exists uniformly throughout a polyamide at the time of spinning. It is possible to add during the polymerization time or at the time of completion of polymerization, or at the time of spinning by way of chip blending or the like method.

When a long chain fatty acid or a higher alkyl amine among the foregoing compounds used as additives, is to be added, it is advantageous to add as a viscosity stabilizer at the time of polymerization in place of acetic acid or the like.

From polyamides thus obtained by incorporating therein a polyethylene glycol or its derivative according to the method of the present invention, it is possible to produce smoothly polyamide fibers having a permanent antistatic effect without bringing about the phenomenon of inter-filamentary adhesion at the time of spinning and abnormality of tension at the time of unwinding and reduction of drawability which are caused by said interfilamentary adhesion.

The effect of the method of the present invention can be seen by referring to the drawing accompanying and forming a part of this specification.

Figure 2:
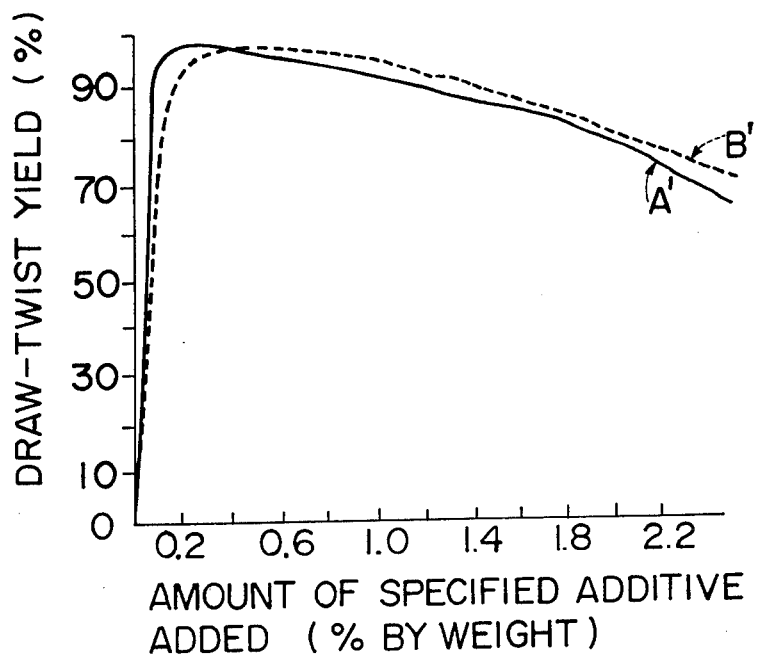

FIG. 1 shows variation of tension at the time of unwinding of undrawn yarns from a package during the drawing step and FIG. 2 shows relationship between amount of additives and drawtwist yields.

A more comprehensive understanding of the invention can be obtained by referring to the following illustrative examples which are not intended, however, to be unduly limitative of the invention. All percents are by weight unless otherwise indicated.

EXAMPLE 1

To a 20 l autoclave, 10 kg of $\epsilon$-caprolactam, 0.3 % by weight of water and 0.5, 3.0 or 9.0 % by weight of commercial polyethylene glycol having a mean molecular weight of 3000 (supplied from Nippon Yushi Co. Ltd.) were added and further predetermined amounts of long chain fatty acids or higher alkylamines (exact amounts are found in Table 1) were added. After flushing with nitrogen, the resultant mixture was polymerized in a closed system on heating at 260°C for 14 hours, and further polymerized in an open system on heating at 260°C for 10 hours. The resultant polymer, after extracted with hot water for 20 hours, was dried to give polymer chips having relative viscosities (in 1 % by weight $H_2SO_4$ solution) of 2.9, 2.7 and 2.5, respectively. These polymers were subjected to spinning by means of a 30 mm melt-extruder, at a spinning temperature of 300°C, 280°C and 270°C, respectively, followed by oiling with an aqueous emulsion type agent containing 5 parts of liquid paraffin, an anionic emulsifier (sulfonated oil) and 90 parts of water, and taken-up as undrawn yarns at a spinning velocity of 600 m/min. The resultant undrawn yarns were drawn by 3.5 times to give yarns of 240 deniers/24 filaments. Further, polymerization and spinning were carried out under the same conditions with those mentioned above except that acetic acid was used as a viscosity-stabilizer in place of long chain fatty acids of higher alkyl amines, as a control.

The tensions of the resultant undrawn yarns at the time of unwinding from a package were observed. As a result, as shown in Table 1 and FIG. 1 (wherein A shows a case where 3.0 % by weight of polyethylene glycol and acetic acid were added and B shows a case where 3.0 % by weight of stearic acid was added), it can be seen that the filament yarns in which long chain fatty acids or higher alkyl amines were added showed smaller tensions at the time of unwinding and were remarkably improved also in the drawing yield as compared with yarns of the control.

Table 1

| Additive | Amount added % by weight | Amount of polyethylene glycol added | | | | | | | | |
|---|---|---|---|---|---|---|---|---|---|---|
| | | 0.5 % by weight | | | 3.0 % by weight | | | 9.0 % by weight | | |
| | | Adhesion | Unwinding tension (g) | Drawtwist yield (%) | Adhesion | Unwinding tension (g) | Drawtwist yield (%) | Adhesion | Unwinding tension (g) | Drawtwist yield (%) |
| Stearic acid | 0.68 | ◎ | 0.5 | 97 | ◎ | 0.8 | 96 | ○ | 2.0 | 85 |
| Acetic acid | 0.14 | ▲ | 2.8 | 76 | X | 15 | 8 | X | 24 | 0 |
| Lauryl amine | 2.40 | ◎ | 0.5 | 96 | ◎ | 1.2 | 95 | ○ | 1.8 | 80 |
| Hexamethylene diamine | 0.14 | ▲ | 2.9 | 53 | X | 13 | 5 | X | 21 | 0 |

State of adhesion between filaments or yarns
◎: No adhesion
○: Slight adhesion between filaments
▲: Adhesion between filaments
X: Adhesion between filaments and between yarns Unwinding tension was observed by recording the tension between an undrawn package on a drawing machine and feed rollers by means of a tension recorder.

Draw-twist yield:

$$\frac{\text{Number of pirns in which no thread-cut occured}}{\text{Total number of pirns fed}} \times 100$$

EXAMPLE 2

To a 500 l autoclave, 200 kg of ε-caprolactam, 0.3 % by weight of catalyst water, 5 % by weight of antistatic agents shown in Table 2 and the additives of the present invention in amounts shown in Table 2 were added. After flushing with nitrogen, the resultant mixture was subjected to melt-polymerization at 260°C for 14 hours in a closed system and further to melt-polymerization at 260°C for 10 hours in an open system. The resultant polymer, after extracted with hot water for 20 hours, was dried and then subjected to spinning by using a melt-extruder at a spinning speed of 600 m/min. to give filament yarns having 70 denier/24 filaments. A common emulsion type oiling agent was used in the spinning.

As controls, spinnings were carried out by using polymers having 5 % by weight of antistatic agents added alone but containing no additive of the present invention under the same condition as above-mentioned. As a result, it can be seen from Table 2 that no inter-filamentary or inter-yarn adhesion was observed, unwinding tension was low and draw-twist yield was notably improved in case of the polymers having the additives of the present invention. In Table 2, APG is the antistatic agent having the formula of

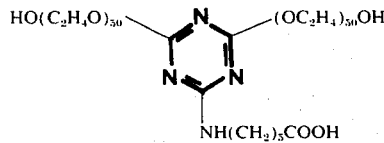

NH(CH$_2$)$_5$COOH and BLOCK means polyalkylene-ether which is a salt obtained by reacting the polyethylene glycol both the ends of which are aminated, with an equivalent amount of adipic acid.

Table 2

| Antistatic agent | mean molecular weight of polyether part | Additive | Amount added % | Adhesion | Unwinding tension g | Draw-twist yield % |
|---|---|---|---|---|---|---|
| APG | 1000 | decane | 0.01 | ○ | 5.8 | 75 |
| " | " | lauric acid | 0.5 | ◎ | 1.1 | 93 |
| " | " | stearamide | 1 | ◎ | 0.9 | 96 |
| " | " | stearyl amine | 2 | ◉ | 0.8 | 85 |
| " | 8000 | stearic acid | 1 | ◎ | 1.0 | 91 |
| " | " | tetracosane | 2 | ◎ | 0.7 | 89 |
| " | " | lauryl amine | 0.01 | ○ | 2.6 | 80 |
| " | " | lauramide | 0.5 | ◎ | 1.2 | 93 |
| BLOCK | 1000 | lauramide | 2.0 | ◎ | 0.6 | 88 |
| " | " | lauryl amine | 1.0 | ◎ | 1.5 | 84 |
| " | " | tetracosane | 0.5 | ○ | 0.8 | 96 |
| " | " | stearic acid | 0.01 | ◎ | 3.0 | 80 |
| " | 8000 | stearyl amine | 0.5 | ◎ | 1.4 | 89 |
| " | " | stearamide | 0.01 | ○ | 4.7 | 78 |
| " | " | lauric acid | 2.0 | ◎ | 1.1 | 87 |
| " | " | decane | 1.0 | ◎ | 1.3 | 95 |
| " | 1000 | non | 0 | X | 18.3 | 10 |
| APG | " | non | 0 | X | 15.0 | 32 |

EXAMPLE 3

Chips of nylon-6 (having a relative viscosity of 2.91 as measured in 1 % by weight H$_2$SO$_4$ solution) were blended with 3 % by weight based on the chips, of polyethylene glycol having a mean molecular weight of 6,000 (made by Nippon Yushi Co.) and 0.3 % by weight based on the chips, of various kinds of additives described in Table 2, by means of a double cone type blender, on heating at 100°C, for 3 hours, and further blended under cooling until the temperature became below 40°C, to make the polyethylene glycol and the additives adhere uniformly to the chips. Polymer chips thus obtained were subjected to spinning in the same manner as in Example 1 to give yarns of 210 deniers/24 filaments.

As a control, spinning was carried out under the same conditions except that no additive was added, to give yarns of 210 deniers/24 filaments.

As a result, as shown in Table 3, yarns having the additives could be spun and drawn as smoothly as in case of usual nylon yarns, and without any abnormality in the unwinding tension due to adhesion between filaments or yarns, as compared with those having no additive.

Table 3

| Additive | State of adhesion | Unwinding tension | Draw-twist yield | Antistatic ** effectiveness |
|---|---|---|---|---|
| Palmitic acid | ◎ | 0.3 | 98 | 5 sec. |
| Ca stearate | ◎ | 0.5 | 93 | 5 |
| Octyl stearate | ◎ | 0.2 | 98 | 5 |
| Octyl laurate | ◎ | 0.3 | 97 | 5 |
| Stearyl amine | ◎ | 0.5 | 89 | 4 |
| Hexamethylene distearamide | ◎ | 0.1 | 96 | 5 |
| Lauramide | ◎ | 0.8 | 95 | 5 |
| n-Tetracosane | ◎ | 0.7 | 85 | 6 |
| Dodecane | ○ | 1.0 | 88 | 6 |
| Control ① * | X | 16 | 20 | 5 |
| Control ② * | ◉ | 0.1 | 97 | 300 |

* Control 1 : Polyethylene glycol is added, but additive is not added.
  Control 2 : Polyethylene glycol and additive are not added.
** Antistatic effectiveness:

The fibers were made into samples of bundle form having 20 layers in thickness, followed by washing with a neutral detergent, washing with water, drying and conditioning for 15 hours in the atmosphere at 20°C having a relative humidity of 40 %. The resultant samples were impressed by a voltage of 10,000 volts for 3 minutes, by means of Honestmeter made by Shishido Shokai Co. and then the impressed voltage was reduced to zero. Thus, the half-value periods. (sec.) of the charged voltage of the samples were made parameters of antistatic property.

In addition, experiments relative to the relationship between the amount of additive and its effectiveness, were carried out with calcium stearate and hexamethylene distearamide in Table 2. The results are shown in FIG. 2 wherein A' shows calcium stearate and B' shows hexamethylene distearamide. As seen in this Figure, the optimal values of the amount of additive are distributed between 0.01 and 2 % by weight.

EXAMPLE 4

2 kg of dry ε-caprolactam, 3 % by weight of water, 5 % by weight based on the lactam, of polyethylene glycol having a mean molecular weight of 2000 and having both the terminals aminated (made by Sanyo Kasei Co.) and an equal mol thereto, of adipic acid, were fed into a 4 l autoclave, and reacted at 260°C for 24 hours. The resultant polymer was extracted with hot water, and sprinkled with stearyl alcohol by 5 % by blending, simultaneously with drying. The resultant polymer chips were subjected to melt-spinning smoothly in the same manner as in Example 1 to give 210 deniers/24 filaments.

|  | State of adhesion | Thread-cut rate at the time of drawing (times/kg) |
|---|---|---|
| Stearyl alcohol | ◎ | 0.2 |
| Lauryl alcohol | ○ | 0.5 |
| No | X | 46 |

EXAMPLE 5

60 weight % aqueous solution of 120 kg of 66 nylon salt was fed in 400 l autoclave provided with a stirrer. Further, there were added thereto, 3 weight % based on the monomer, of an antistatic agent having the following structure (formula 1):

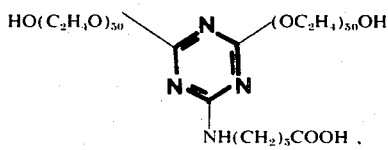

and 0.01, 0.5 or 2.0 weight % of tetracosane. The insides of each autoclave were flushed sufficiently with nitrogen, and melt-polymerizations were carried out at 230°C, under a pressure of 17.5 kg/cm², for 1 hour, and then at 270°C, under a pressure of 17.5 kg/cm², for 2 hours. The pressure was elevated in 2 hours and heating was continued for 30 minutes. The resultant polymers were taken out of the autoclave under a nitrogen pressure to obtain polymers having a relative viscosity of 45 (as measured in 10 % by weight formic acid solution). The spinnings of these polymers were carried out at a spinning temperature of 280°C, in the same manner as in Example 1 to give fibers of 210 deniers/24 filaments.

As a control, a polymer having 3 % by weight based on the weight of monomer, of the above-mentioned antistatic agent alone added, was polymerized and subjected to spinning under the same conditions as those of the above-mentioned. The results are shown in Table 4. As seen in this Table, polymers containing tetracosane showed no abnormality in unwinding tension due to the adhesion between filaments and could be smoothly spun and drawn, as compared with those containing an antistatic agent alone.

Further it can be seen that as for its amount to be added, the effectiveness is small if the amount is below 0.01 weight %, while a harmful influence of the additive upon the workability appears if the amount is above 2.0 weight %, and thus an optimal range of the amount to be added lies between 0.01 and 2.0 weight %.

Table 4

| Amount of compound of formula 1 added wt. % | Amount of tetracosane added wt. % | State of adhesion | Unwinding tension g | Draw-twist yield % |
|---|---|---|---|---|
| 3.0 | 0 | X | 13.8 | 33 |
| 3.0 | 0.01 | ○ | 4.6 | 76 |
| 3.0 | 0.50 | ○ | 0.5 | 98 |
| 3.0 | 2.00 | ◎ | 0.3 | 82 |
| 0 | 0 | ◎ | 0.6 | 96 |

EXAMPLE 6

Blended chips of nylon 6 whose 1 % $H_2SO_4$ solution has a relative viscosity of 2.5 and nylon 66 whose 10 % formic acid solution has a relative viscosity of 45, in a blending ratio by weight of 7:3, were blended with 3 weight % based on the chips, of the antistatic agent same with that used in Example 5 and 0.5 weight % of stearic acid, by means of a doulbe cone type blender, for 3 hours on heating at 100°C, and then blending was continued under cooling till the temperature became below 40°C, to insure the uniform adhesion of the antistatic agent and stearic acid to the chips. The polymer chips thus obtained were subjected to spinning at a spinning temperature of 280°C, in the same manner as in Example 1 to give fibers of 210 deniers/24 filaments.

As a control, chips containing 3 weight % based on the chips, of the above-mentioned antistatic agent alone were subjected to spinning under the same conditions as mentioned above. The results are shown in Table 5. As seen in this Table, those containing stearic acid showed no intra-filamentary adhesion, and could be smoothly spun and drawn.

Table 5

| Amount of compound of formula 1 added wt.% | Amount of stearic acid added wt.% | State of adhesion | Draw-twist yield % |
|---|---|---|---|
| 3.0 | 0.6 | ◎ | 90 |
| 3.0 | 0.0 | ○ | 5 |

What is claimed is:
1. A modified homopolyamide composition suitable for melt spinning fibers without causing inter-filamen- tary adhesion, said composition consisting essentially of a homopolyamide intimately combined with (a) 0.5 - 10% by weight based upon the weight of said homopolyamide of a member selected from the group consisting of (1) a polyethylene glycol, (2) a polyethylene glycol chemically bonded to a polyamide through ester linkages, amide linkages or urethane linkages, and (3) a polymer obtained by addition of (1) or (2) to a compound having an active hydrogen; and (b) 0.01 - 2% by weight based upon the weight of said homopolyamide of a second component, said component having a boiling point of at least 200°C and being a long chain fatty acid or salt thereof having 11 carbon atoms or more.

2. The composition of claim 1 wherein the long chain fatty acid is selected from the group consisting of lauric acid, myristic acid, palmitic acid, stearic acid, arachic acid, behenic acid, palmitolic acid, oleic acid, linoleic acid, linolenic acid and salts thereof formed with metals of Groups I, II and III of the Periodic Table.

3. In the method of producing a modified homopolyamide by subjecting a polyamide blend to melt spinning, the improvement comprising melt spinning the said modified homopolyamide compositon of claim 1, whereby inter-filamentary adhesion is obviated.

* * * * *